(12) United States Patent
Mayrench et al.

(10) Patent No.: US 8,483,641 B1
(45) Date of Patent: Jul. 9, 2013

(54) VALIDATION AND STABILIZATION OF NOISE MATRICES

(75) Inventors: Ronen Mayrench, Ra'anana (IL); Ezer Melzer, Tel Aviv (IL)

(73) Assignee: Marvell International Ltd., Hamilton (BM)

( * ) Notice: Subject to any disclaimer, the term of this patent is extended or adjusted under 35 U.S.C. 154(b) by 109 days.

(21) Appl. No.: 13/185,505

(22) Filed: Jul. 19, 2011

Related U.S. Application Data

(60) Provisional application No. 61/368,448, filed on Jul. 28, 2010.

(51) Int. Cl.
*H04B 1/10* (2006.01)

(52) U.S. Cl.
USPC ...... 455/296; 455/307; 455/67.13; 455/226.1

(58) Field of Classification Search
USPC .......................... 455/296, 307, 67.13, 226.1
See application file for complete search history.

(56) References Cited

U.S. PATENT DOCUMENTS

| | | | |
|---|---|---|---|
| 5,548,819 A | 8/1996 | Robb | |
| 6,904,110 B2 | 6/2005 | Trans et al. | |
| 7,103,316 B1 | 9/2006 | Hall | |
| 7,379,851 B2 | 5/2008 | Koizumi et al. | |
| 7,466,969 B2 | 12/2008 | Kimata et al. | |
| 7,561,627 B2 | 7/2009 | Chow et al. | |
| 7,649,964 B2 | 1/2010 | Matsumoto | |
| 7,702,042 B2 | 4/2010 | Desperben et al. | |
| 7,848,469 B2 | 12/2010 | Majonen | |
| 7,929,592 B1 | 4/2011 | Okumura et al. | |
| RE42,317 E | 5/2011 | Al-Dhahir et al. | |
| 7,965,619 B2 * | 6/2011 | Taira et al. | 370/203 |
| 2004/0076185 A1 | 4/2004 | Kim et al. | |
| 2005/0107039 A1 | 5/2005 | Lindoff et al. | |
| 2005/0243791 A1 | 11/2005 | Park et al. | |
| 2005/0281324 A1 | 12/2005 | Wallen | |
| 2006/0007990 A1 * | 1/2006 | Cozzo et al. | 375/148 |
| 2006/0034398 A1 | 2/2006 | Reznik et al. | |
| 2006/0251156 A1 | 11/2006 | Grant et al. | |
| 2007/0053417 A1 | 3/2007 | Nagata et al. | |
| 2007/0058735 A1 | 3/2007 | Ghosh | |
| 2007/0142009 A1 | 6/2007 | Scarpa et al. | |
| 2007/0183537 A1 | 8/2007 | Matsumoto | |
| 2007/0287382 A1 | 12/2007 | Catreux-Erceg et al. | |
| 2008/0008258 A1 | 1/2008 | Tanabe et al. | |
| 2008/0051095 A1 | 2/2008 | Chang et al. | |
| 2008/0153428 A1 | 6/2008 | Han et al. | |
| 2008/0165901 A1 | 7/2008 | Krupka | |
| 2008/0225934 A1 | 9/2008 | Mourad et al. | |

(Continued)

OTHER PUBLICATIONS

3GPP TR 36.814 V0.4.1, "3rd Generation Partnership Project; Technical Specification Group Radio Access Network; Evolved Universal Terrestrial Radio Access (E-UTRA); Further advancements for E-UTRA physical layer aspects (Release 9)", Feb. 2009.

(Continued)

*Primary Examiner* — Sanh Phu

(57) ABSTRACT

A method includes receiving a signal via multiple receive antennas. A noise covariance matrix, which indicates noise correlations between pairs of the receive antennas, is estimated. A stability criterion defined over the noise covariance matrix is evaluated, and the noise covariance matrix is modified when the stability criterion is violated. The received signal is processed using the modified noise covariance matrix.

16 Claims, 3 Drawing Sheets

U.S. PATENT DOCUMENTS

| | | |
|---|---|---|
| 2008/0285674 A1 | 11/2008 | Tseng et al. |
| 2009/0022217 A1 | 1/2009 | Kimata |
| 2009/0046582 A1 | 2/2009 | Sarkar et al. |
| 2009/0075686 A1 | 3/2009 | Gomadam et al. |
| 2009/0122900 A1 | 5/2009 | Mege et al. |
| 2009/0291642 A1 | 11/2009 | Cozzo et al. |
| 2009/0296863 A1 | 12/2009 | Tirkkonen et al. |
| 2010/0067620 A1 | 3/2010 | Reznik et al. |
| 2010/0111223 A1 | 5/2010 | Thomas et al. |
| 2010/0124893 A1 | 5/2010 | Clevorn et al. |
| 2010/0197262 A1 | 8/2010 | Hosokawa et al. |
| 2011/0026566 A1 | 2/2011 | Grant |
| 2011/0096853 A1 | 4/2011 | Jayaraman et al. |
| 2011/0142102 A1 | 6/2011 | Okumura et al. |
| 2011/0222638 A1 | 9/2011 | Park et al. |
| 2011/0249588 A1 | 10/2011 | Petersson et al. |
| 2011/0249779 A1 | 10/2011 | Miao et al. |
| 2011/0305268 A1 | 12/2011 | Lindoff et al. |
| 2012/0027115 A1 | 2/2012 | Grant et al. |
| 2012/0195397 A1 | 8/2012 | Sayana et al. |

OTHER PUBLICATIONS

3GPP TS 36.211 V8.6.0, "3rd Generation Partnership Project; Technical Specification Group Radio Access Network; Evolved Universal Terrestrial Radio Access (E-UTRA); Physical Channels and Modulation (Release 8)", Mar. 2009.

3GPP TS 36.213 V8.6.0, "3rd Generation Partnership Project; Technical Specification Group Radio Access Network; Evolved Universal Terrestrial Radio Access (E-UTRA); Physical layer procedures (Release 8)", Mar. 2009.

U.S. Appl. No. 12/831,282, filed Jul. 7, 2010.

U.S. Appl. No. 12/831,282 Office Action dated Oct. 3, 2012.

U.S. Appl. No. 12/831,282 Office Action dated Feb. 14, 2013.

Dangl et al., "An Improved Block Equalization Scheme for Uncertain Channel Estimation", IEEE Transactions on Wireless Communications, vol. 6, No. 1, pp. 146-156, Jan. 2007.

* cited by examiner

VALIDATION AND STABILIZATION OF NOISE MATRICES

CROSS-REFERENCE TO RELATED APPLICATIONS

This application claims the benefit of U.S. Provisional Patent Application 61/368,448, filed Jul. 28, 2010, whose disclosure is incorporated herein by reference.

FIELD OF THE DISCLOSURE

The present disclosure relates generally to communication systems, and particularly to methods and systems for validating and stabilizing noise covariance matrices.

BACKGROUND

Some communication receivers receive signals over multiple communication channels using multiple receive antennas. Multi-antenna reception is used, for example, in Single-Input Multiple-Output (SIMO) and Multiple-Input Multiple-Output (MIMO) communication schemes. MIMO schemes are applied, for example, in Evolved Universal Terrestrial Radio Access (E-UTRA) systems, also referred to as Long Term Evolution (LTE) systems, and in subsequent LTE-Advanced (LTE-A) systems.

The Third Generation Partnership Project (3GPP) E-UTRA standards specify MIMO schemes for use by E-UTRA User Equipment (UE) and base stations (eNodeB). These schemes are described, for example, in 3GPP Technical Specification 36.211, entitled "Technical Specification Group Radio Access Network; Evolved Universal Terrestrial Radio Access (E-UTRA); Physical Channels and Modulation (Release 8)," (3GPP TS 36.211), version 8.6.0, March, 2009, in 3GPP Technical Specification 36.213, entitled "Technical Specification Group Radio Access Network; Evolved Universal Terrestrial Radio Access (E-UTRA); Physical Layer Procedures (Release 8)," (3GPP TS 36.213), version 8.6.0, March, 2009, and in 3GPP Technical Report 36.814, entitled "Technical Specification Group Radio Access Network; Further Advancements for E-UTRA Physical Layer Aspects (Release 9)," (3GPP TR 36.814), version 0.4.1, February, 2009, which are incorporated herein by reference.

The description above is presented as a general overview of related art in this field and should not be construed as an admission that any of the information it contains constitutes prior art against the present patent application.

SUMMARY

An embodiment that is described herein provides a method, which includes receiving a signal via multiple receive antennas. A noise covariance matrix, which indicates noise correlations between pairs of the receive antennas, is estimated. A stability criterion defined over the noise covariance matrix is evaluated, and the noise covariance matrix is modified when the stability criterion is violated. The received signal is processed using the modified noise covariance matrix.

In some embodiments, processing the received signal includes demodulating the received signal using the modified noise covariance matrix. In an embodiment, processing the received signal includes computing one or more Channel State Information (CSI) metrics using the modified noise covariance matrix.

In a disclosed embodiment, estimating the noise covariance matrix includes estimating one or more non-zero off-diagonal elements of the noise covariance matrix, and evaluating the stability criterion includes assessing the stability criterion over the non-zero off-diagonal elements. In an embodiment, evaluating the stability criterion includes verifying whether the non-zero off-diagonal elements are smaller than a threshold in relation to diagonal elements of the noise covariance matrix, and modifying the noise covariance matrix includes setting the non-zero off-diagonal elements to zero.

In another embodiment, verifying whether the non-zero off-diagonal elements are smaller than the threshold includes calculating a ratio between the non-zero off-diagonal elements and the diagonal elements, and comparing the ratio to the threshold. In still another embodiment, evaluating the stability criterion includes verifying whether the noise covariance matrix is positive-definite, and modifying the noise covariance matrix includes scaling down the non-zero off-diagonal elements by a predefined scale factor. In an example embodiment, scaling down the non-zero off-diagonal elements includes iteratively scaling down the non-zero off-diagonal elements until the noise covariance matrix becomes positive-definite.

In some embodiments, the method includes, upon detecting that a diagonal element of the noise covariance matrix is non-positive, setting the diagonal element to a positive value. In an embodiment, modifying the noise covariance matrix includes causing the noise covariance matrix to meet the stability criterion. In another embodiment, receiving the signal includes receiving one of a Single-Input Multiple-Output (SIMO) signal and a Multiple-Input Multiple-Output (MIMO) signal via the multiple receive antennas.

There is additionally provided, in accordance with an embodiment that is described herein, apparatus including a receiver front-end and a processor. The receiver front-end is configured to receive a signal via multiple receive antennas. The processor is configured to estimate a noise covariance matrix that indicates noise correlations between pairs of the receive antennas, to evaluate a stability criterion defined over the noise covariance matrix, to modify the noise covariance matrix when the stability criterion is violated, and to process the received signal using the modified noise covariance matrix. In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide improved methods and systems for reception using multiple antennas. Disclosed techniques validate and stabilize noise that is estimated by a multi-antenna receiver. In some embodiments, the receiver receives a signal via multiple receive antennas, and estimates a noise covariance matrix whose elements indicate the noise power per antenna and noise correlations between pairs of the antennas. The receiver then uses the noise covariance matrix in processing received signals, e.g., for demodulation or channel estimation.

In some practical scenarios, however, the estimated noise covariance matrix deviates from the actual noise covariance matrix, for example because of estimation and/or quantization errors. These deviations potentially cause errors and instability in subsequent receiver processing that is based on the estimated noise covariance matrix.

In some embodiments, the receiver validates the estimated noise covariance matrix and, if needed, modifies the matrix in order to stabilize it. Typically, the receiver evaluates a stability measure (and an associated criterion) that are defined over the elements of the estimated covariance matrix. In some embodiments, the stability measure and criterion are evaluated over non-zero off-diagonal elements of the estimated noise covariance matrix. If the stability criterion is violated, the receiver modifies the matrix in order to meet the criterion. Subsequent processing, such as demodulation or channel estimation, is performed using the stabilized matrix.

Several examples of stability criteria and stabilization schemes are described herein. In one embodiment, the receiver checks whether the ratio between the non-zero off-diagonal elements and the diagonal elements of the estimated noise covariance matrix is smaller than a threshold. If so, the non-zero off-diagonal elements are reset to zero. In another embodiment, the receiver verifies whether the estimated noise covariance matrix is positive-definite. If not, the non-zero off-diagonal elements are scaled down so as to make the modified matrix positive-definite. In yet another embodiment, the receiver ensures that all the diagonal elements of the matrix are positive.

The methods and systems described herein ensure that the receiver processes the received signals using a stable noise covariance matrix. By using these techniques, the receiver is able to achieve improved demodulation and channel estimation accuracy by exploiting the additional information offered by the off-diagonal matrix elements (i.e., the noise cross-correlations between different receive antennas). This performance improvement is achieved without risk of errors or instability.

Figure 1:
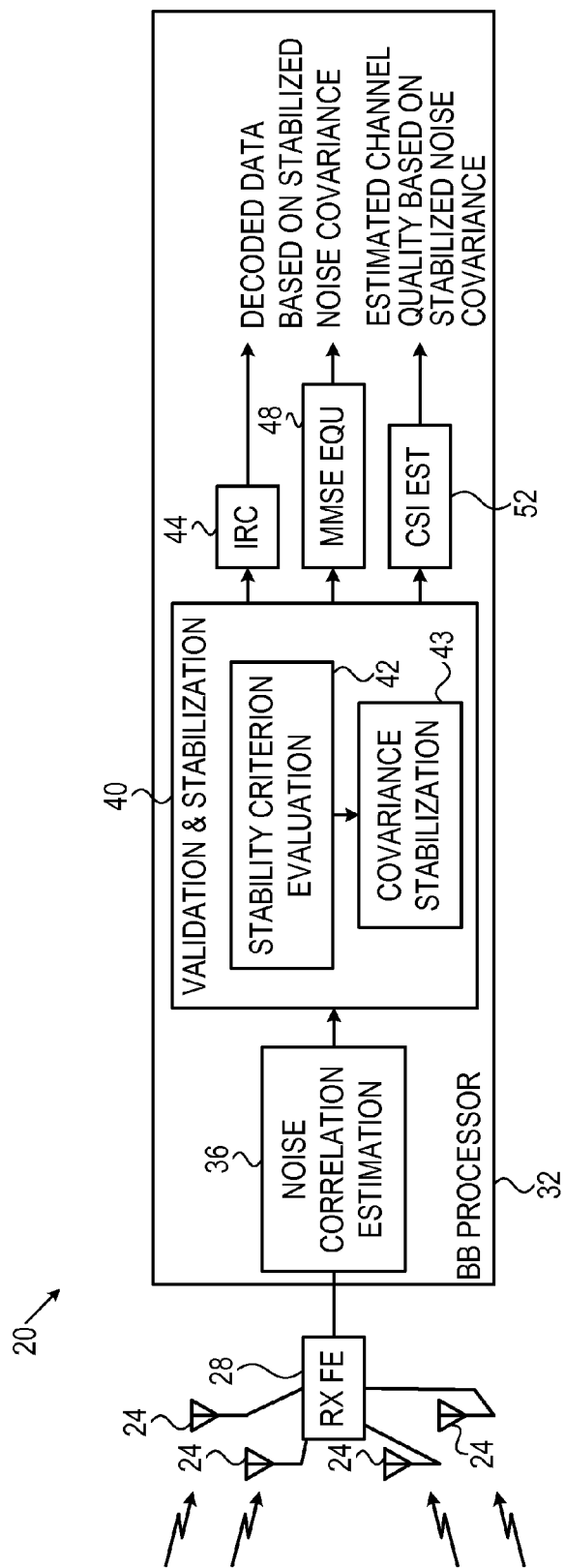
FIG. 1 is a block diagram that schematically illustrates a receiver, in accordance with an embodiment that is described herein.

FIG. 1 is a block diagram that schematically illustrates a receiver 20, in accordance with an embodiment that is described herein. Receiver 20 receives signals from a transmitter (not shown) via multiple antennas 24. Antennas 24 are referred to herein as receive antennas, although in some embodiments they are used for both reception and transmission. In some embodiments, receiver 20 operates in accordance with the E-UTRA (LTE) specifications, cited above. In alternative embodiments, the receiver operates in accordance with the LTE-Advanced (LTE-A) protocol, in accordance with a certain MIMO or SIMO protocol, or in accordance with any other suitable communication protocol that supports multiple receive antennas.

In an embodiment, receiver 20 is embodied in a mobile communication terminal, such as an LTE User Equipment (UE). In an alternative embodiment, receiver 20 is embodied in any other suitable communication equipment, such as in a base station.

In an embodiment, receiver 20 comprises a receiver front-end (RX FE) 28 and a baseband (BB) processor 32. RX FE 28 receives the signals from antennas 24, down-converts the received signals to baseband, and typically performs additional functions such as low-noise amplification, filtering, gain control and digitization.

Baseband processor 32 processes the baseband signals produced by RF FE 28. Some of the processes carried out by processor 32 make use of a noise covariance matrix denoted $R_{nn}$. Each element of this matrix gives the noise correlation between a respective pair of receive antennas. In other words, for N receive antennas, $R_{nn}$ is an N-by-N matrix whose $ij^{th}$ element is the noise correlation between the $i^{th}$ receive antenna and the $j^{th}$ receive antenna.

The noise covariance matrix $R_{nn}$ comprises diagonal elements and off-diagonal elements. The diagonal elements are defined as the $ij^{th}$ elements for which i=j, and the off-diagonal elements are defined as the $ij^{th}$ elements for which i≠j. In the following example noise covariance matrix, the diagonal elements are marked "D" and the off-diagonal elements are marked "O":

$$R_{nn} = \begin{bmatrix} D & O & O & O \\ O & D & O & O \\ O & O & D & O \\ O & O & O & D \end{bmatrix} \quad \text{Equation 1}$$

Processor 32 comprises a noise correlation estimation module 36, which estimates the noise power per antenna 24 and the noise correlations between pairs of antennas 24 from the received signals. In the embodiment of FIG. 1, module 36 uses the received signals to estimate the noise covariance matrix $R_{nn}$. In various embodiments, processor 32 uses the estimated matrix $R_{nn}$ for various purposes, such as for signal demodulation and/or channel quality estimation.

In practice, however, the estimate of matrix $R_{nn}$ produced by module 36, deviates from the actual noise covariance matrix. The deviations are caused, for example, by estimation errors, quantization errors or any other reason. Such deviations potentially distort the demodulation and channel estimation processes, and in some cases cause instability or divergence.

In some embodiments, processor 32 comprises a validation and stabilization module 40 (referred to below as a stabilization module for brevity). Module 40 validates whether the estimated noise covariance matrix produced by module 36 is stable and, if not, modifies the matrix so as to stabilize it. Subsequent processing is then applied to the stabilized matrix that is produced by stabilization module 40. In the present example, module 40 comprises a stability criterion evaluation unit 42, which evaluates a stability criterion defined over the elements of matrix $R_{nn}$. Module 40 further comprises a covariance stabilization unit 43, which modifies matrix $R_{nn}$ so as to meet the stability criterion. The stabilized noise covariance matrix is provided as output of module 40.

In the embodiment of FIG. 1, BB processor 32 comprises an Interference Rejection Combiner (IRC) 44, a Minimum Mean Square Error (MMSE) equalizer 48, and a Channel State Information (CSI) estimation module 52. These modules demonstrate various possible processes that make use of the stabilized noise covariance matrix produced by validation and stabilization module 40. In alternative embodiments, processor 32 may comprise any subset of these modules, or any other suitable module that processes the received signals using the stabilized noise covariance matrix.

IRC 44 is used, for example, to combine the signals that are received by antennas 24 when the transmitter deploys a single transmit antenna or uses a transmit diversity transmission scheme. MMSE equalizer 48 is used, for example, to combine the signals that are received by antennas 24 when the transmitter uses a spatial multiplexing transmission scheme. CSI estimation module 52 estimates the response of the communication channels via which the signals are received by antennas 24. The channel response is typically expressed using one or more CSI metrics.

Modules 44, 48 and 52 are typically able to provide improved performance when operating on the full noise covariance matrix, as opposed to operating only on the diagonal matrix elements. Consider, for example, a scenario of a single transmit antenna and two receive antennas 24, in which the received signal is given by:

$$Y_0 = S + 0.7 \cdot I + \sqrt{0.001} \cdot N_0 \qquad \text{Equation 2}$$
$$Y_1 = S + 0.3 \cdot I + \sqrt{0.001} \cdot N_1$$

wherein S denotes a transmitted symbol, I denotes an interference term, $N_i$ denotes the noise term at the $i^{th}$ receive antenna, and $Y_i$ denotes the received signal at the $i^{th}$ receive antenna (i=0,1). The noise terms $N_0$ and $N_1$ and the interference term I are all assumed to be uncorrelated with one another. The noise and interference terms are assumed to have an average power of unity, i.e., $E\{|N_i|^2\}=E\{|I|^2\}=1$.

In this example scenario, IRC equalization by module 44 would produce a signal (an estimate of the transmitted symbol) that is given by:

$$\tilde{S} = [1 \ 1] \cdot R_{nn}^{-1} \cdot \begin{bmatrix} Y_0 \\ Y_1 \end{bmatrix} \qquad \text{Equation 3}$$

wherein the noise (including interference) covariance matrix $R_{nn}$ is given by:

$$R_{nn} = \begin{bmatrix} 0.7^2 + 0.001 & 0.7 \cdot 0.3 \\ 0.7 \cdot 0.3 & 0.3^2 + 0.001 \end{bmatrix} \qquad \text{Equation 4}$$

From Equation 4 it can be shown that the Signal to Noise Ratio (SNR) at the output of IRC module 44 is approximately 24 dB when using the full noise covariance matrix, and only approximately 11 dB when using only the diagonal terms of the matrix (i.e., when substituting $R_{nn}$ of Equation 4, with its off-diagonal elements set to zero, into Equation 3).

On the other hand, as explained above, using the full noise covariance matrix may lead to stability problems. Typically although not necessarily, stability problems are likely to occur if the estimated noise covariance matrix is not positive-definite. In some embodiments, unit 42 in stabilization module 40 validates the estimated noise covariance matrix that is provided by module 36, typically by evaluating a stability criterion that requires the magnitudes of the off-diagonal elements of the matrix to be sufficiently small relative to the diagonal elements. The criterion typically requires that the estimated noise covariance matrix be positive-definite.

If the stability criterion is violated, unit 43 in module 40 stabilizes the estimated noise covariance matrix so as to meet the criterion, e.g., by modifying some of the matrix elements until the matrix becomes positive-definite. Modules 44, 48 and 52 operate on the stabilized matrix, and therefore can achieve superior performance without risk of instability. Several examples of stabilization criteria and stabilization schemes are described below.

The receiver configuration shown in FIG. 1 is an example configuration, which is depicted solely for the sake of clarity. In alternative embodiments, any other suitable receiver configuration can be used. For example, the disclosed techniques can be used with receivers having any suitable number of receive antennas. Receiver elements that are not mandatory for understanding of the disclosed techniques have been omitted from the figure for the sake of clarity.

In some embodiments, some or all of the elements of receiver 20, including RX FE 28 and BB processor 32 including modules 36, 40, 42, 43, 44, 48 and 52, are implemented in hardware, such as using one or more Radio Frequency Integrated Circuits (RFICs), Field-Programmable Gate Arrays (FPGAs) or Application-Specific Integrated Circuits (ASICs). In an alternative embodiment, certain receiver elements, such as certain elements of BB processor 32, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
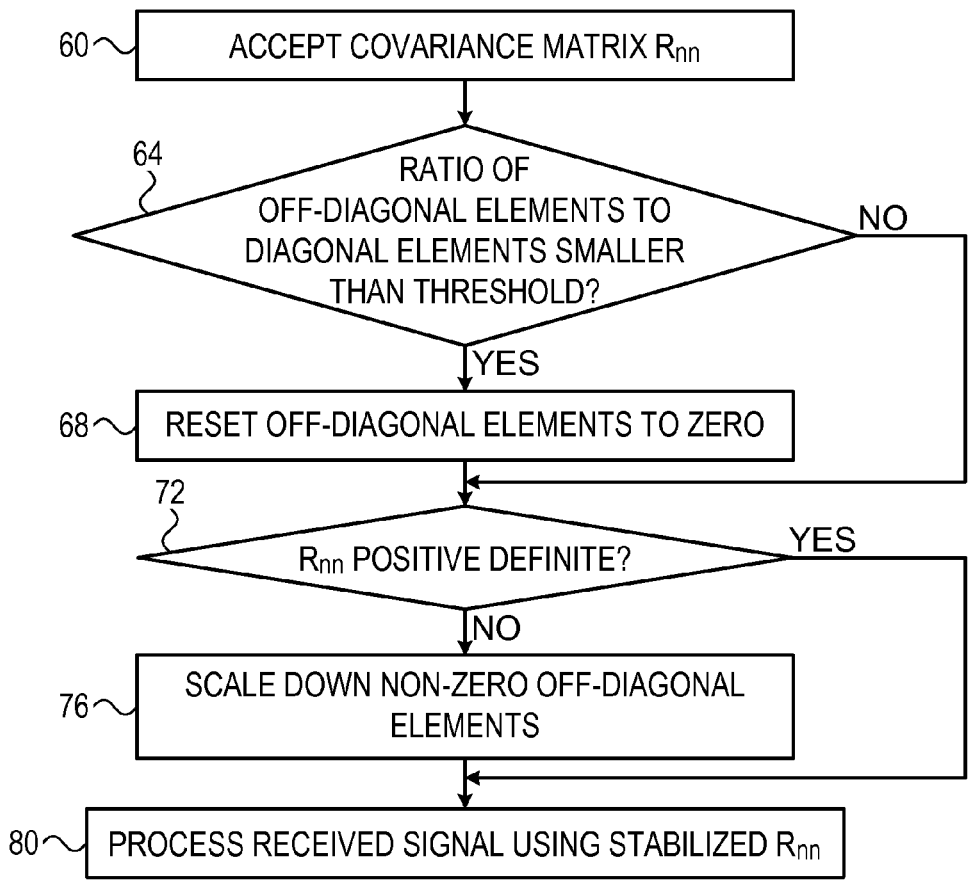
FIGS. 2 and 3 are flow charts that schematically illustrate methods for stabilizing noise covariance matrices, in accordance with embodiments that are described herein.

FIG. 2 is a flow chart that schematically illustrates a method for stabilizing noise covariance matrix $R_{nn}$, in accordance with an embodiment that is described herein. The example of FIG. 2 refers to stabilization of a 2-by-2 matrix. This technique, however, can be generalized in a straightforward manner to noise covariance matrices of any other dimensions.

In the disclosed embodiment, the method begins with stabilization module 40 accepting an estimated noise covariance matrix from $R_{nn}$ estimation module 36, at an input operation 60. Initially, module 40 checks whether the estimated noise covariance matrix is sufficiently similar to a diagonal matrix. If so, in an embodiment, only the diagonal matrix elements are used and the off-diagonal matrix elements are ignored. When the off-diagonal matrix elements are sufficiently small relative to the diagonal elements (e.g., at least one or two orders of magnitude smaller), such an approximation eliminates the risk of instability while causing little or no performance degradation. This situation occurs, for example, when the noise terms at the receive antennas comprise white spatial noise.

In the embodiment of FIG. 2, module 40 checks whether the ratio between the non-zero off-diagonal matrix elements and the diagonal matrix elements is smaller than a predefined threshold, at a threshold checking operation 64. In an example embodiment, for each i≠j the ratio between the magnitude $|R_{nn}(i,j)|$ of the $ij^{th}$ element of the $R_{nn}$ matrix and the minimal (or some mean) value of the diagonal elements $R_{nn}(i,i)$ and $R_{nn}(j,j)$ is computed, to decide whether this ratio is smaller than the predefined threshold. If so, module 40 resets the non-zero off-diagonal matrix element to zero, at a resetting operation 68. Otherwise, operation 68 is bypassed.

For the case of two receive antennas, the threshold comparison of operation 64 can be written as:

$$\frac{|c|^2}{a \cdot b} < Th1, \ R_{nn} = \begin{bmatrix} a & c \\ c^* & b \end{bmatrix} \qquad \text{Equation 5}$$

wherein Th1 denotes the threshold, a and b denote the (real) diagonal matrix elements of $R_{nn}$, and c and c* denote the pair of complex conjugate off-diagonal elements of $R_{nn}$. If the condition of Equation 5 is met, module 40 resets c (and hence also c*) to zero. Similar conditions can be defined for other numbers of receive antennas.

Validation and stabilization module 40 then checks whether the estimated covariance matrix is positive-definite, at a positive-definite checking operation 72. A covariance matrix is positive-definite by definition, and therefore deviations from this condition are attributed to errors. Moreover, performing subsequent processing (e.g., equalization) using a non-positive-definite noise covariance matrix may lead to numerical instability.

For a 2-by-2 matrix (two receive antennas), verifying that the matrix is positive-definite is equivalent to verifying that (i) both diagonal matrix elements are positive, and (ii) the determinant of the matrix is positive. In some embodiments, module 40 implements operation 72 by verifying these two conditions. For other numbers of receive antennas, similar conditions can be defined.

If stabilization module 40 finds that the estimated noise covariance matrix is not positive-definite, module 40 scales down the non-zero off-diagonal matrix elements, at a scaling operation 76. Otherwise, operation 76 is bypassed. The scaling operation causes the matrix to become positive-definite.

In an example embodiment, for a 2-by-2 matrix (two receive antennas), module 40 checks whether the matrix is positive-definite by calculating:

$$\Delta_{norm} = 1 - \frac{|c|^2}{a \cdot b}, R_{nn} = \begin{bmatrix} a & c \\ c^* & b \end{bmatrix} \quad \text{Equation 6}$$

and checking whether $\Delta_{norm}$<Th2, wherein Th2 denotes a predefined threshold such as 0.001. If the condition is met, module 40 normalizes the off-diagonal matrix elements by the factor:

$$scale = \sqrt{(1 - Th2)\frac{a \cdot b}{|c|^2}} \quad \text{Equation 7}$$

This sort of normalization ensures that the determinant of the normalized matrix is at least Th2, and therefore that the normalized matrix is positive-definite.

Processor 32 then processes the received signal using the stabilized noise covariance matrix that is produced by module 40, at a processing operation 80.

Figure 3:
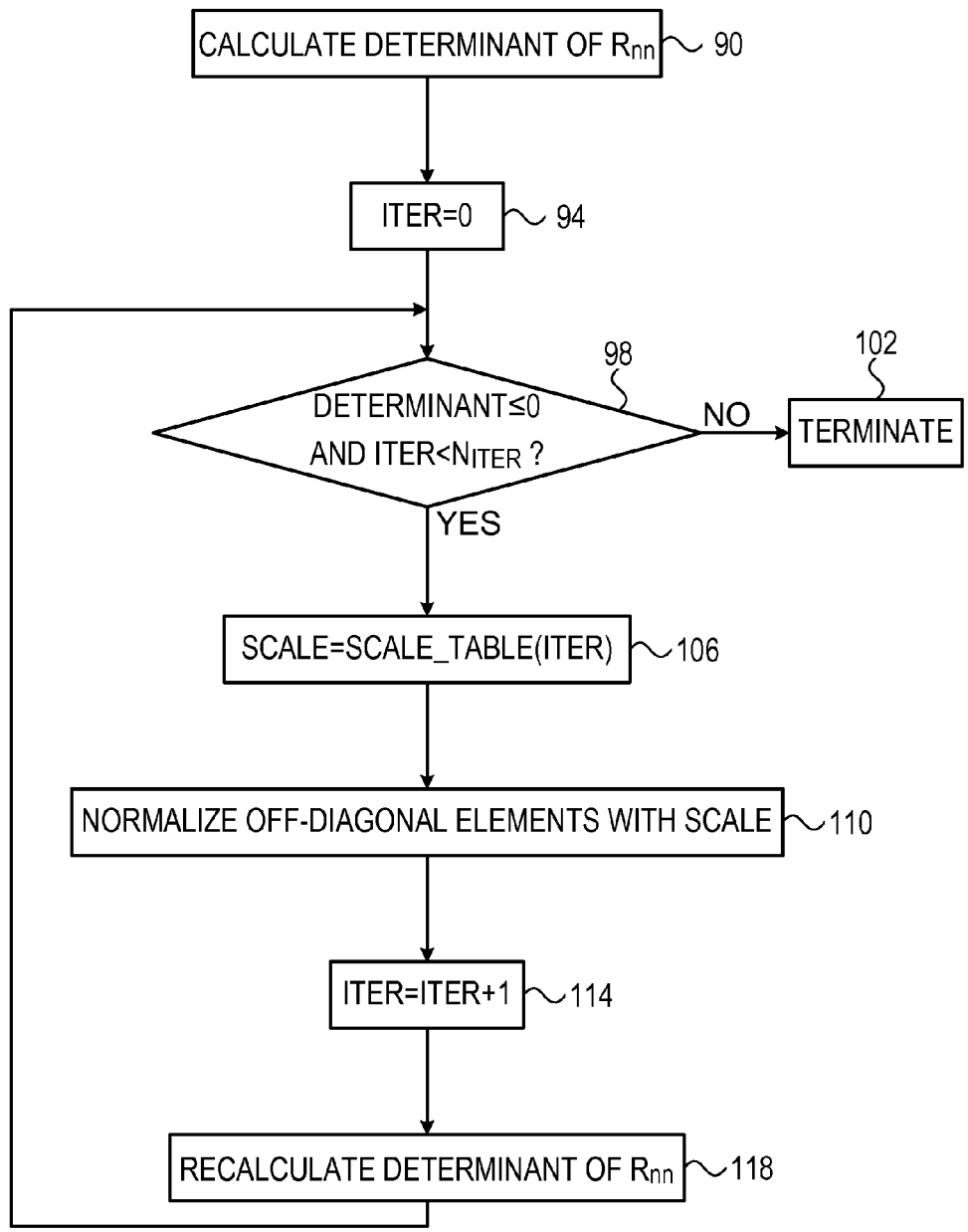

FIG. 3 is a flow chart that schematically illustrates a method for stabilizing noise covariance matrix $R_{nn}$, in accordance with another embodiment that is described herein. Although the example of FIG. 3 refers to a 2-by-2 matrix, the technique can be generalized in a straightforward manner to noise covariance matrices of any desired dimensions. In this method, stabilization module 40 scales down the non-zero off-diagonal matrix elements of the estimated $R_{nn}$ in a sequence of stabilization iterations, until the matrix becomes positive-definite. In one embodiment, the method of FIG. 3 is used for implementing operation 76 of FIG. 2 above.

In this example, the scaling factor used for scaling down the off-diagonal elements varies from one iteration to the next. Validation and stabilization module 40 holds a table denoted SCALE_TABLE(ITER), which specifies the scaling factor depending on the iteration index ITER. In addition, the number of iterations is limited to a maximum number denoted $N_{ITER}$.

The method begins with module 40 calculating the determinant of the estimated noise covariance matrix $R_{nn}$, at a determinant calculation operation 90. For the 2-by-2 matrix used in the examples above, the determinant is given by $a \cdot b - |c|^2$. Module 40 initializes the iteration index ITER to zero, at an initialization operation 94.

Module 40 checks whether stabilization is required, at a checking operation 98. In the present example, module 40 checks whether the determinant is non-positive (Determinant≦0), and whether the number of iterations performed already does not exceed the maximum allowed number (ITER<$N_{ITER}$). If either of these conditions is not met, the method terminates, at a termination step 102, and module 40 outputs the estimated noise covariance matrix.

Otherwise, i.e., if stabilization is to be performed, module 40 determines a scaling factor to be applied in the current iteration, at a scale factor determination operation 106. In the embodiment of FIG. 3, module 40 retrieves the scaling factor SCALE from the above-described table, i.e., SCALE=SCALE_TABLE(ITER). Module 40 multiplies the off-diagonal matrix elements of the estimated $R_{nn}$ by this scaling factor, at a normalization operation 110. Module 40 then increments the iteration index ITER, at an incrementing operation 114, and recalculates the determinant of the estimated $R_{nn}$, at a determinant recalculation operation 118.

The method then loops back to operation 98 above, in which module 40 checks whether the iterative process should be terminated or continued. The iterations continue until the determinant of $R_{nn}$ becomes positive, or until a maximum number of iterations is reached (as verified at step 98).

In the method of FIG. 3, module 40 may use any suitable scaling factors and any suitable maximum number of iterations, e.g., two iterations. In some embodiments, if the method terminates after performing the maximum number of iterations but the determinant of $R_{nn}$ is still non-positive, module 40 resets the off-diagonal matrix elements to zero.

As another example of a stability criterion and corresponding corrective action, in some embodiments stabilization module 40 checks whether any of the diagonal elements of the estimated $R_{nn}$ is non-positive. If a non-positive diagonal element is found, module 40 sets this element to a certain (typically small) positive value (e.g., some fixed value if all diagonal elements are non-positive, or some relative value such as 25 dB below the diagonal element having the maximal positive value).

Generally, the diagonal elements of a valid covariance matrix are positive. A certain diagonal element may become non-positive, for example, because of quantization errors. This technique re-stabilizes the matrix by ensuring that all the diagonal elements are positive before proceeding with subsequent processing.

The embodiments described above demonstrate several example stability criteria and corresponding modifications to the estimated noise covariance matrix. In alternative embodiments, stabilization module 40 may evaluate any other suitable stabilization criterion and apply any other suitable corrective action to the matrix when the criterion is violated. As noted above, the disclosed techniques are in no way limited to 2-by-2 noise covariance matrices, and can be used for stabilizing larger matrices, as well.

Although the embodiments described herein mainly address communication systems operating in accordance with the LTE specifications, including LTE-A, the methods and systems described herein can also be used in other applications, such as Wireless Local Area Networks (WLAN, also referred to as Wi-Fi), WiMAX networks operating in accordance with IEEE 802.16 specifications, or in any other suitable system or application.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving a signal via multiple receive antennas;
   estimating a noise covariance matrix, which indicates noise correlations between pairs of the receive antennas, including estimating one or more non-zero off-diagonal elements of the noise covariance matrix;
   evaluating a stability criterion defined over the non-zero off-diagonal elements of the noise covariance matrix by verifying whether the non-zero off-diagonal elements are smaller than a threshold in relation to diagonal elements of the noise covariance matrix, and modifying the noise covariance matrix by setting the non-zero off-diagonal elements to zero when the stability criterion is violated; and
   processing the received signal using the modified noise covariance matrix.

2. The method according to claim 1, wherein processing the received signal comprises demodulating the received signal using the modified noise covariance matrix.

3. The method according to claim 1, wherein processing the received signal comprises computing one or more Channel State Information (CSI) metrics using the modified noise covariance matrix.

4. The method according to claim 1, wherein verifying whether the non-zero off-diagonal elements are smaller than the threshold comprises calculating a ratio between the non-zero off-diagonal elements and the diagonal elements, and comparing the ratio to the threshold.

5. A method, comprising:
   receiving a signal via multiple receive antennas;
   estimating a noise covariance matrix, which indicates noise correlations between pairs of the receive antennas, including estimating one or more non-zero off-diagonal elements of the noise covariance matrix;
   evaluating a stability criterion defined over the non-zero off-diagonal elements of the noise covariance matrix by verifying whether the noise covariance matrix is positive-definite, and modifying the noise covariance matrix by scaling down the non-zero off-diagonal elements by a predefined scale factor when the stability criterion is violated; and
   processing the received signal using the modified noise covariance matrix.

6. The method according to claim 5, wherein scaling down the non-zero off-diagonal elements comprises iteratively scaling down the non-zero off-diagonal elements until the noise covariance matrix becomes positive-definite.

7. The method according to claim 1, comprising, upon detecting that a diagonal element of the noise covariance matrix is non-positive, setting the diagonal element to a positive value.

8. The method according to claim 1, wherein modifying the noise covariance matrix comprises causing the noise covariance matrix to meet the stability criterion.

9. The method according to claim 1, wherein receiving the signal comprises receiving one of a Single-Input Multiple-Output (SIMO) signal and a Multiple-Input Multiple-Output (MIMO) signal via the multiple receive antennas.

10. Apparatus, comprising:
    a receiver front-end, which is configured to receive a signal via multiple receive antennas; and
    a processor, which is configured to estimate a noise covariance matrix that indicates noise correlations between pairs of the receive antennas, including estimating one or more non-zero off-diagonal elements of the noise covariance matrix, to evaluate a stability criterion defined over the non-zero off-diagonal elements of the noise covariance matrix by verifying whether the non-zero off-diagonal elements are smaller than a threshold in relation to diagonal elements of the noise covariance matrix, to modify the noise covariance matrix by setting the non-zero off-diagonal elements to zero when the stability criterion is violated, and to process the received signal using the modified noise covariance matrix.

11. The apparatus according to claim 10, wherein the processor is configured to verify whether the noise covariance matrix is positive-definite, and to modify the noise covariance matrix by scaling down the non-zero off-diagonal elements by a predefined scale factor.

12. The apparatus according to claim 11, wherein the processor is configured to iteratively scale down the non-zero off-diagonal elements until the noise covariance matrix becomes positive-definite.

13. The apparatus according to claim 10, wherein the processor is configured to detect that a diagonal element of the noise covariance matrix is non-positive, and to set the diagonal element to a positive value.

14. The apparatus according to claim 10, wherein the processor is configured to cause the noise covariance matrix to meet the stability criterion.

15. A mobile communication terminal comprising the apparatus of claim 10.

16. A chipset for processing signals in a mobile communication terminal, comprising the apparatus of claim 10.

* * * * *